Jan. 20, 1959  H. J. McDEVITT  2,869,663
SHOES FOR HOLD-DOWN MECHANISM FOR STORAGE BATTERIES
Filed Aug. 10, 1956
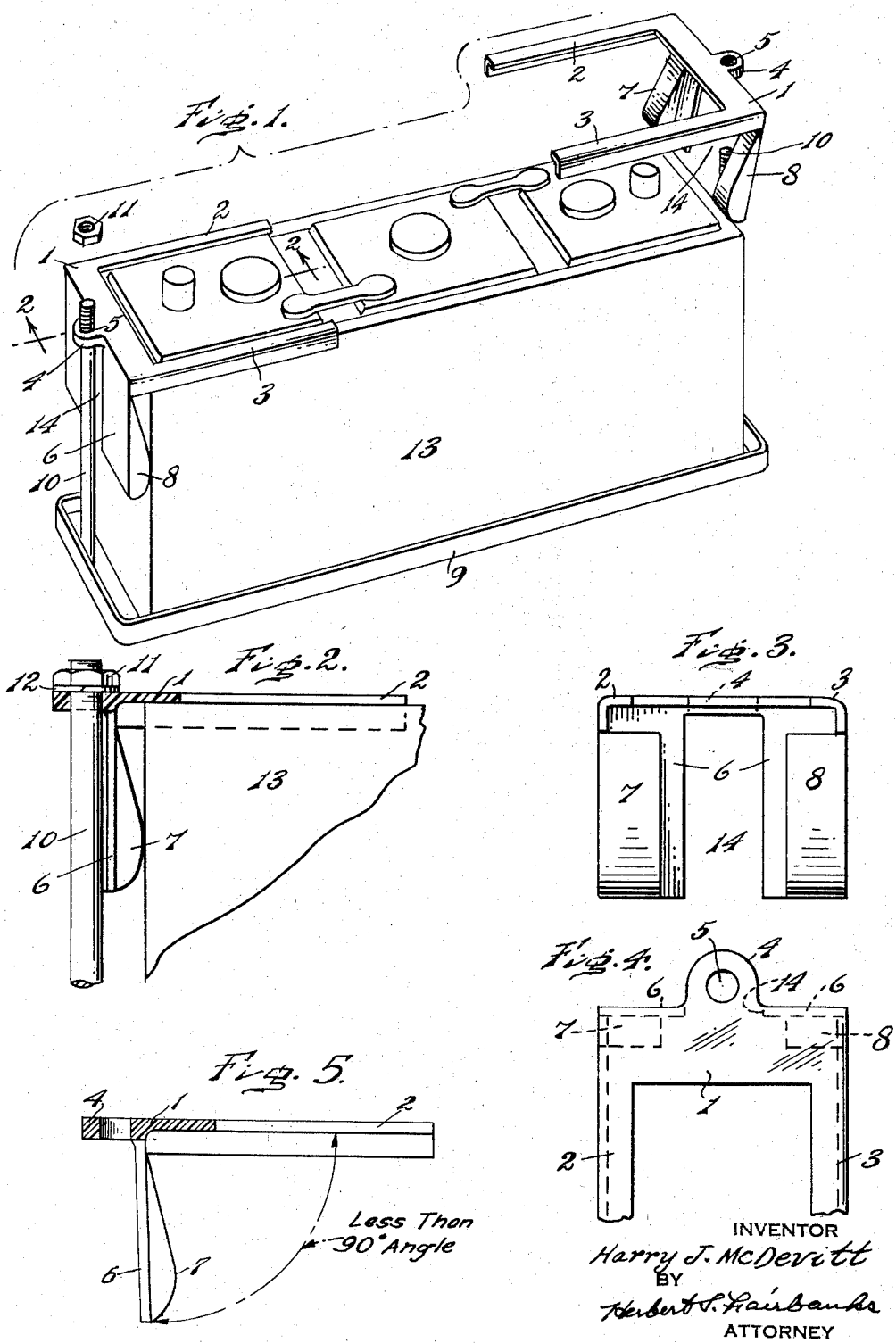
INVENTOR
Harry J. McDevitt
BY
Herbert S. Fairbanks
ATTORNEY

United States Patent Office 2,869,663
Patented Jan. 20, 1959

2,869,663

SHOES FOR HOLD-DOWN MECHANISM FOR STORAGE BATTERIES

Harry J. McDevitt, Hatboro, Pa.

Application August 10, 1956, Serial No. 603,357

4 Claims. (Cl. 180—68.5)

Storage batteries for automotive use are conventionally mounted in a bottom pan, suitably supported, with hold-down clamping mechanism acting against the hard rubber battery case to provide the necessary pressure for positioning and retaining the battery in assembled condition with the bottom pan.

The object of my invention is to devise a novel construction and arrangement of flexible shoes or pressure members of suitable insulating material, such as for example a suitable plastic, said members having an end plate with bearing portions contacting an end wall of the battery case and having an integral top plate through which a clamping bolt passes, whereby, when the nut is applied to the bolt, the top plate and side strips thereof will be pressed downwardly against the hard rubber top face of the battery case.

Other novel objects and features of the invention will hereinafter appear in the detailed description and the appended claims.

For the purpose of illustrating the invention, I have shown in the accompanying drawings a preferred embodiment of it which, in practice, will give satisfactory and reliable results. It is, however, to be understood that the various instrumentalities of which the invention consists can be variously arranged and organized, and the invention is not limited to the exact arrangement and organization of these instrumentalities as herein set forth except by the scope of the appended claims.

Figure 1 is a perspective view of shoes for holddown clamping mechanism for storage batteries.

Figure 2 is a section on line 2—2 of Figure 1.

Figure 3 is an end elevation.

Figure 4 is a top plan view, partly broken away of one of the shoes.

Figure 5 is a longitudinal section of a shoe.

Similar numerals of reference indicate corresponding parts.

Referring to the drawings:

The shoes embodying my invention are molded from a suitable plastic, and comprise a body portion 1 having laterally spaced, forwardly projecting clamping strips 2 and 3 shown in the form of angles having a slip fit over the top side edges of a battery case.

The body portion has a rearwardly extending lug 4 having a hole 5 through it. End plates 6 are arranged in spaced relationship and depend downwardly from the rear end of the body portion and form an angle of less than 90° with the upper part of the body portion. The plates 6 are provided with cams 7 and 8 projecting inwardly from the plates and the inner faces of the cams are rounded at their lower portions and taper therefrom upwardly and towards the end plates.

A conventional pan or tray 9 has clamping rods 10 fixed to its end portions, and these rods extend upwardly through the holes 5 in the lugs 4 and are provided at their upper ends with nuts 11 and washers 12 to clamp a storage battery 13 to the pan 9, the latter being supported in the conventional manner on the chassis or body of an automobile.

A space 14 between the end plates 6 provides clearance for the clamping rods 10.

The clamping strips 2 and 3 seat on opposite top edge portions of the battery case and terminate near the inner ends of the outer cells of the battery.

In assembling the shoes with the battery and battery case, the two shoes are disposed at an angle above the end portions of the case and lowered downwardly. The cams, contacting the ends of the case rock the shoes to bring the clamping strips 2 and 3 parallel with the top face of the case and position the holes 5 in alignment with the clamping rods. When the washers and nuts are applied to the clamping rods, due to the clamping strips and depending end plates being normally at less than a right angle to each other, sufficient tension is applied to the battery to hold it in its case without distortion of the case.

My invention provides complete accessibility for adding water and checking the specific gravity; complete ventilation is provided to prevent melting of the cells; cutting of the ground strap is eliminated, and excessive pressure on the case is eliminated, thereby preventing buckling of the battery plates and distortion of the case.

The shoes are constructed of dia-electric material, and thereby eliminate the possibility of short circuiting with the battery cables.

In assembling the shoes, they are disposed at an angle above the ends of the case and lowered towards the case. The cam portions contacting the end walls of the case rock the shoes to bring the clamping strips parallel with the top face of the case and bring the hole in the shoe in alignment with a clamping bolt.

Having thus described my invention, what I claim as new and desire to secure by Letters Patent is:

1. Hold-down clamping mechanism for storage batteries, comprising a pair of molded, flexible, plastic shoes of insulating material at opposite ends of a storage battery case, each having a body portion with laterally spaced, forwardly projecting side angles, each having a depending member at its outer end with a cam portion on its inner face to contact a wall of the battery case, the contact of the cam portion with the case being at an acute angle with said side angles, in combination with a battery support, and clamping rods connected with said support, said shoes having holes to receive said clamping rods, and said rods being provided above the shoes with nuts, said shoes when angularly disposed above the end portions of the case and moved downwardly causing the cam portions to contact the end walls of the case and rock the shoes to bring the side angles flat on the top of the case and align the holes with the rods.

2. Hold-down mechanism for storage batteries, comprising a pair of shoes of insulating material for opposite ends of a battery case, each of said shoes having a body portion to seat on the top wall at the end of the case and having integral therewith a pair of laterally spaced, forwardly projecting clamping strips angular in cross section to seat on the top side portions of the case at the ends of the case, said body portion at its rear end having integral, depending end members forming an angle of less than 90° with the upper part of the body portion and the clamping strips and having on their inner faces cams tapering upwardly from their bottom, whereby, when the shoes are angularly disposed to the top of the case and moved downwardly, the cams contacting the end of the case will rock the clamping strips into a position parallel with the top of the case and in alignment at the outer ends with conventional clamping bolts.

3. The construction defined in claim 2, wherein the clamping strips terminate near the inner ends of the outer cells of the battery.

4. In hold-down mechanism for storage batteries, a molded shoe of insulating, plastic material having a body portion with laterally spaced, forwardly projecting clamping strips to seat on opposite top edge portions of a battery case and terminating near the inner ends of the outer cells of the battery, said body portion having a rearwardly extending lug to receive a clamping rod, and said body portion having a depending end portion forming an angle of less than 90° with the clamping strips, and said end portion having on its inner face cam means tapering upwardly and towards the end portion.

References Cited in the file of this patent

UNITED STATES PATENTS

| | | |
|---|---|---|
| 1,172,347 | Ford | Feb. 22, 1916 |
| 1,535,906 | Davoll | Apr. 28, 1925 |
| 1,677,789 | Mabey | July 17, 1928 |
| 2,326,481 | Meyer | Aug. 10, 1943 |
| 2,453,835 | Donkin | Nov. 16, 1948 |
| 2,613,755 | Newby et al. | Oct. 14, 1952 |

FOREIGN PATENTS

| | | |
|---|---|---|
| 647,562 | Great Britain | Dec. 13, 1950 |